United States Patent [19]
Wilson

[11] 3,789,219
[45] Jan. 29, 1974

[54] MUD CAKE COMPENSATED NEUTRON LOGGING SYSTEM

[75] Inventor: Billy Fred Wilson, Houston, Tex.

[73] Assignee: Dresser Industries, Inc., Dallas, Tex.

[22] Filed: Apr. 24, 1972

[21] Appl. No.: 247,128

[52] U.S. Cl.................. 250/264, 250/265, 250/269, 250/270
[51] Int. Cl............................................. G01v 5/00
[58] Field of Search.......... 250/83.1, 83.3 R, 83.6 W

[56] References Cited
UNITED STATES PATENTS
3,566,117   2/1971   Tixier............................ 250/83.6 W
3,453,433   7/1969   Alger et al................... 250/83.6 W Primary Examiner—Archie R. Borchelt
Attorney, Agent, or Firm—Eddie E. Scott; John N. Hazelwood

[57] ABSTRACT

A neutron source and a gamma ray source are positioned in the instrument housing of a well logging instrument to irradiate the formations surrounding a well bore. A short-spaced gamma ray detector and a long-spaced gamma ray detector positioned in the instrument housing detect radiation from the formations and transmit electrical signals representing the radiation to the surface. The electrical signals are compared to provide a signal representing mud cake in the well bore. A third detector positioned in the instrument housing detects radiation from the formations surrounding the well bore and transmits a neutron logging signal to the surface. The signal representing mud cake in the well bore is applied to the neutron logging signal to provide a mud cake compensated neutron log.

9 Claims, 6 Drawing Figures

PATENTED JAN 29 1974 3,789,219

MUD CAKE COMPENSATED NEUTRON LOGGING SYSTEM

BACKGROUND OF THE INVENTION

The present invention relates to the art of well logging and, more particularly, to a well logging system for providing a mud cake compensated neutron log.

Neutron logging systems of the prior art have been somewhat inaccurate because the neutron logging signal is seriously affected by the thickness, chemical content and density of the mud and mud cake between the logging instrument and the formation of interest. It is often impossible to eliminate this cause of error in the neutron logging system because the walls of boreholes to be logged are frequently rough and irregular due to erosion and a logging instrument cannot contact the wall uniformly along its length. Additionally, the mud cake is frequently compacted to such a degree that an instrument cannot cut through it to contact the wall. Instead, the instrument slides along substantially on top of the layer of mud cake. It is therefore desirable to provide a neutron logging system that includes means for correcting the neutron log for the effects of mud cake.

Systems for providing a mud cake compensated density log are known in the prior art. These systems utilize a short-spaced detector and a long-spaced detector to obtain the mud cake compensated density log. Such systems are represented by U.S. Pat. No. 3,038,075 to A. H. Youmans, patented June 5, 1962 and U.S. Pat. No. 3,538,329 to F. J. Niven, Jr., patented November 3, 1970. The mud cake compensated density logging systems produce a compensation signal that is positive when a light mud cake is encountered and the signal becomes more positive when the light mud cake gets thicker. The compensation signal goes negative when a heavy mud cake is encountered and more negative when the heavy mud cake gets thicker. This type of a compensation signal is required in a density logging system because the particular density of the mud cake must be considered when applying the compensation signal. The compensation signal for a neutron logging system on the other hand will always be negative because all mud cake adds to the neutron porosity signal.

BRIEF DESCRIPTION OF THE PRIOR ART

In U.S. Pat. No. 2,469,461 to W. L. Russell, a logging system is disclosed including a source and two gamma ray detectors. One of the detectors is spaced from the source a distance which is less than the distance at which the changes in the well produce zero response at a detector when said source and detector are substantially in contact with said formation. The other detector is spaced at a distance greater than the aforementioned distance. The system includes means for maintaining the source and detectors substantially in contact with the formations. The detectors are connected to the adjacent arms of an electrical bridge circuit and means are provided for indicating the output of said bridge circuit as a function of depth in the well.

In U.S. Pat. No. 3,038,075 to A. H. Youmans, patented June 5, 1962, a system for the compensation of density logging instruments is shown. The system includes a subsurface instrument housing with a gamma ray source, a first gamma ray detector and a second gamma ray detector. Means are provided for differentially combining the outputs of the first and second gamma ray detectors to obtain an output that contains a differential borehole effect component.

In U.S. Pat. No. 3,538,329 to F. J. Niven, Jr., a signal correction system for a well logging instrument having short and long-spaced radioactivity detectors and a borehole caliper is shown. The well logging system includes a gamma ray source, a short-spaced radioactivity detector, a long-spaced radioactivity detector and a borehole caliper coupled through a logging cable to surface electronics. The surface electronics includes a borehole compensation circuit, a function generator circuit and a signal comparison circuit functionally interconnected with a pair of counting rate meter circuits to provide compensation for the effects of mud cake and borehole nonuniformity upon the logging of the density of the formations surrounding the well bore.

In U.S. Pat. No. 3,608,373 to A. H. Youmans, a method and well logging apparatus having acoustic and neutron pads is shown. The acoustic pad has an acoustic transmitting transducer and a pair of acoustic receiving transducers for producing an acoustic time interval measurement. The neutron pad has a capsulated neutron source and an epithermal neutron detector that responds to variations in formation porosity and to the thickness and constituency of mud and mud cake intervening between the pad and the formation. The acoustic pad serves to indicate the extent of the effect on the neutron derived porosity measurement due to the mud and mud cake and permits a corrective porosity to be derived and recorded.

SUMMARY OF THE INVENTION

The present invention provides a system for producing a mud cake compensated neutron log. The system includes an instrument housing containing means for irradiating the formations with gamma rays and neutrons, a short-spaced gamma ray detector, a long-spaced gamma ray detector and a third detector for detecting neutrons. The signals from the short-spaced detector and the long-spaced detector are processed to obtain a compensation signal. The compensation signal is utilized to apply mud cake correction to the signal from the third detector and to provide a mud cake compensated neutron log. The compensation signal may also be utilized to apply mud cake correction to a density logging signal from the long-spaced detector thereby providing a simultaneous mud cake compensated density log.

It is therefore an object of the present invention to provide a mud cake compensated neutron log.

It is a further object of the present invention to provide a system for producing a compensation signal suitable for applying a mud cake correction to a neutron logging signal to obtain a mud cake compensated neutron log.

It is a still further object of the present invention to provide a system that will produce a mud cake compensated density log and a mud cake compensated neutron log simultaneously.

The above and other objects and advantages of the present invention will become apparent from a consideration of the following detailed description of the invention when taken in conjunction with the drawings.

DETAILED DESCRIPTION OF THE INVENTION

Figure 1:
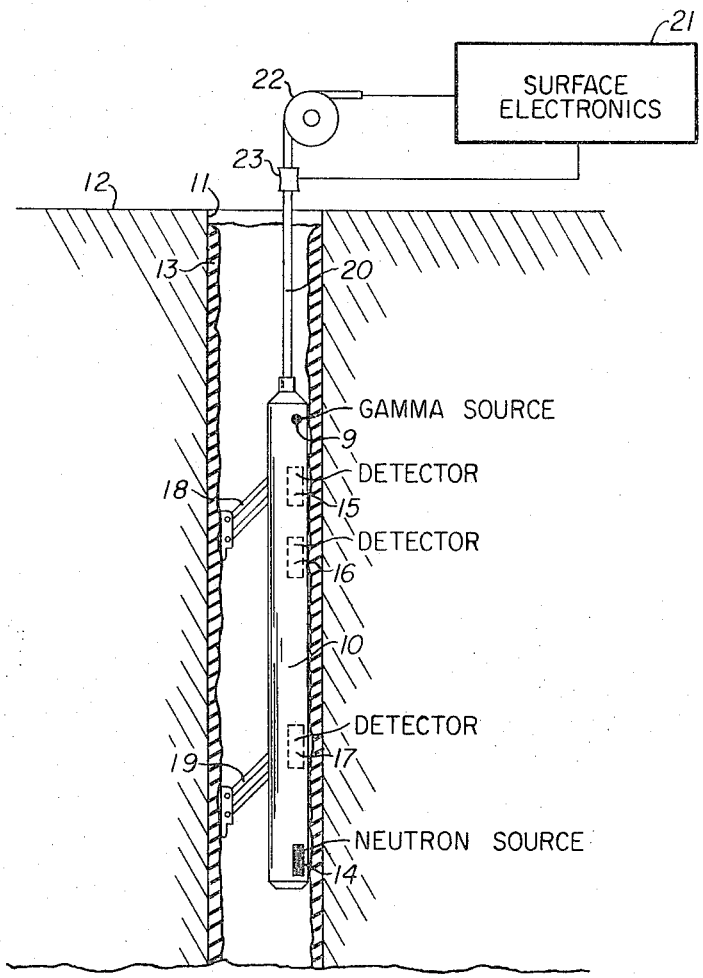
FIG. 1 is a side elevational view, partly in section, showing a well logging system of the present invention with the well logging instrument housing positioned in a well bore in operative position for producing a log.

Referring now to the drawings and, in particular, to FIG. 1, there is illustrated schematically a well logging system constructed in accordance with the present invention with the logging instrument housing 10 positioned in an uncased well 11 penetrating the earth's surface 12. A mud cake layer 13 such as is found in some uncased wells lines the wall of the well bore 11. The well logging instrument housing contains a neutron source 14. The neutron source 14, for example, may be an encapsulated neutron source including a mixture of americium and beryllium. The instrument also contains a gamma ray source 9 which may be $Cs^{137}$ or some other gamma emitting isotope. A short-spaced radioactivity detector 15 is positioned in the instrument housing 10 below source 9. A long-spaced radioactivity detector 16 is positioned in the instrument housing 10 below the detector 15. A third radioactivity detector 17 is positioned in the instrument housing 10 above source 14 for detecting radiation from the formations surrounding the well bore 11 and transmitting a signal to the surface that will be used to provide the improved neutron log. A pair of caliper instruments 18 and 19 are positioned in the instrument housing 10. The caliper instruments 18 and 19 insure that the instrument housing 10 is positioned next to the mud cake layer 13 during the logging operation. A cable 20 suspends the instrument housing 10 in the well and contains the required conductors for electrically connecting the instrument housing 10 with the surface electronics 21. The cable is wound on or unwound from drum 22 in raising and lowering the instrument housing 10 to traverse the well 11 during the logging operation. The cable 20 passes over a measuring device 23 that is connected with the surface electronics to correlate the logs obtained with the instrument housings 10 depth in the well.

The instrument housing 10 is moved through the well 11 during the well logging operation. Neutrons from the neutron source 14 are directed into the formations surrounding the well bore 11 and gamma rays from the gamma ray source are directed into the formations surrounding the well bore 11. The radioactivity detectors 15, 16 and 17 detect radiation emanating from the formations surrounding the well bore resulting from the formations being irradiated by neutrons and gamma rays from the sources 9 and 14. The signals produced by the detectors 15, 16 and 17 are transmitted along the cable 20 to the earth's surface 12 and to the surface electronics section 21. A pair of recorders within the surface electronics 21 are driven by the measuring device 23 in synchronism with the movement of the cable 20 to correlate the logs with depth in the well bore 11. The elements are shown diagrammatically and it is to be understood that the associated circuits and power supplies are provided in the conventional manner. It is also to be understood that the instrument housing 10 is constructed to withstand the pressures and mechanical and thermal abuses encountered in logging a deep well and provides adequate space within it to house the necessary apparatus and to permit the transmission of radiation therethrough. The system shown in FIG. 1 uses two sources, one gamma and one neutron, but it is to be understood that it would be possible to use a single source, such as $Ra^{226}Be$ where both gamma rays and neutrons are emitted.

Figure 2:
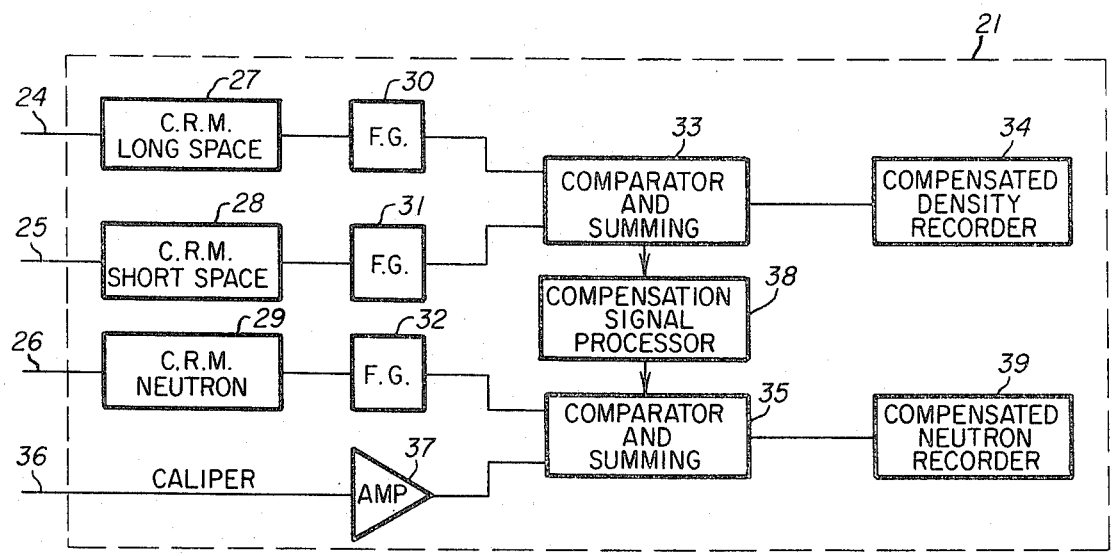
FIG. 2 is a block diagram of the surface electronics of a well logging system constructed in accordance with the present invention.

Referring now to FIG. 2, a block diagram of the surface electronics section 21 is shown. The signal 24 from the long-spaced detector, the signal 25 from the short-spaced detector and the signal 26 from the third detector are transmitted up the logging cable and transmitted to the surface electronics section 21. The signal 24 is transmitted to the long-spaced count rate meter 27, the signal 25 is transmitted to the short-spaced count rate meter 28 and the signal 26 is transmitted to the third or neutron count rate meter 29. The output voltage of count rate meter 27 is fed into function generator circuit 30, the output voltage of count rate meter 28 is fed into function generator circuit 31 and the output voltage of the count rate meter 29 is fed into he function generator circuit 32.

The output of function generator circuits 30 and 31 are voltages that vary linearly with a change in bulk density. These voltages are fed into a comparison and summing circuit 33. When no mud cake is encountered, the output of the comparator is zero. In the case of a light mud cake, a negative signal is used to reduce the density value by a proper amount. In the case of a heavy mud cake, a positive signal is used to increase the density value to its proper value. The corrected density signal is transmitted to the compensated density recorder 34 to provide a compensated density log.

The output of the function generator 32 will vary linearly with changes in formation porosity. This voltage is fed into a comparator and summing circuit 35. A caliper signal 36 from one of the caliper units 18 or 19 in logging instrument housing 10 is amplified by amplifier 37 and fed into the comparator and summing circuit 35. At some borehole size, such as 7⅞ inch diameter, the output from the comparator is zero. When the borehole gets larger, the neutron porosity will look higher than it really is so a signal from the comparator circuit 35 reduces the porosity reading to its proper value. When the borehole gets smaller than the selected zero compensation value, the uncorrected porosity values are too low so a signal from the comparator circuit 35 increases the porosity to its proper value. A compensation signal processor 38 takes the output from the comparator and summing circuit 33 and feeds a mud cake correction signal into the comparator and summing circuit 35. As mud cake increases in thickness, the uncompensated porosity value is too high. The signal from the compensation signal processor 38 corrects the neutron porosity to its proper value. The compensated neutron signal from the comparator and summing circuit 35 is then recorded by the compensated neutron recorder 39 to provide a compensated neutron log.

Figure 3:
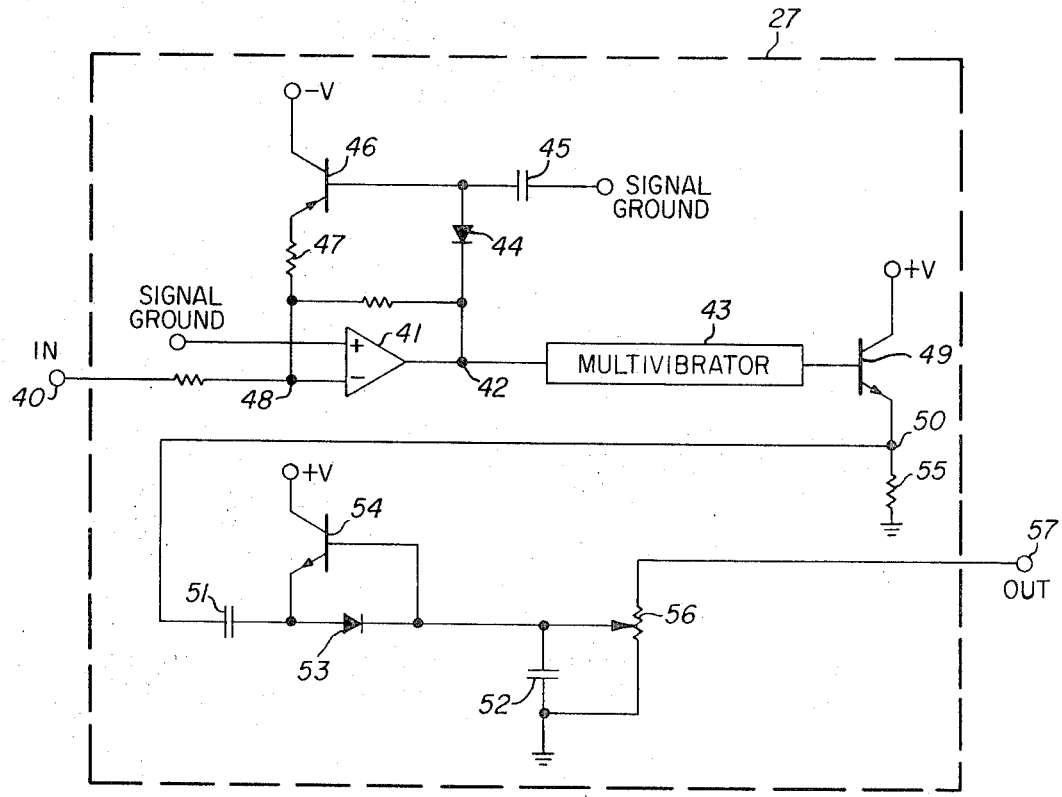
FIG. 3 is a schematic diagram of one of the count rate meter circuits of the surface electronics.

Referring now to FIG. 3, a count rate meter circuit according to the present invention is illustrated, for example, such as count rate meter circuit 27 of FIG. 2. It is to be understood that the count rate meter circuit shown in FIG. 3 also illustrates the count rate meter circuits 28 and 29 of FIG. 2. The input terminal 40 taken from the cable 20 of FIG. 1, couples positive going pulses into the inverting input of the operational amplifier 41, the gain of the amplifier being set at approximately 50. The negative going output pulses at terminal 42 are coupled into the multivibrator circuit 43, the multivibrator circuit gating level being set to be triggered on at a minimum amplitude of approximately −1 volt from ground level. The multivibrator circuit 43 can be a conventional one shot configuration. At approximately −1 volt on the terminal 42, the diode 44 also conducts, thereby charging capacitor 45. The relatively small charge on the capacitor 45 is drained by the base of transistor 46 and amplified through the emitter of the transistor 46, then gain coupled through the resistor 47 back to the inverting terminal of amplifier 41. The non-inverting terminal, identified as the positive terminal of the amplifier 41, is connected to signal ground. Thus, a pulse train appearing on terminal 40 causes an analog voltage to appear on the capacitor 45 of amplitude proportional to pulse amplitude. From resistor 47 the current biases the summing junction 48 in a negative direction, thereby opposing the positive input pulses. The output appearing at terminal 42 then indicates the pulse base line rising in a positive direction, thereby raising noise voltages away from the trigger level of the one-shot multivibrator circuit 43. It should be appreciated that the transistor 46 could be replaced by other conventional amplifiers.

The output of multivibrator circuit 43 is coupled into the base of transistor 49, the transistor 49 being connected in an emitter follower configuration. The pulse appearing at terminal 50 is nominally set at +10 volts, thus charging capacitors 51 and 52, most of the voltage being dropped across capacitor 51. Diode 53 conducts during the rise time of the pulse and turns off after capacitor 51 is fully charged. The transistor 54 equalizes the voltage on either side of the diode 53 by allowing current to flow from the positive collector voltage of transistor 54 into the junction of capacitor 51 and diode 43 when the driving pulse falls to zero. The fall time of the pulse at the emitter of transistor 49 is the capacitor 51 discharging through resistor 55 to ground. The charge on capacitor 52 is drained by the variable resistor 56, the setting of the resistor 56 providing a sensitivity control for the counting rate meter circuit. Since the charge across capacitor 52 is maintained at a constant level for a single input repetition rate occurring at terminal 40, the circuit may be considered a constant current source. The analog voltage across capacitor 52 is coupled into the output terminal 51 which may be monitored, for example, by an operational amplifier (not illustrated) connected as a variable gain follower if desired. It has been found that such a count rate meter circuit counts positive-going pulses from 20 mv. to 600 mv. amplitude and rejects noise with voltage less than 50 percent of the signal voltage at repetition rate greater than 1 per second.

Figure 4:
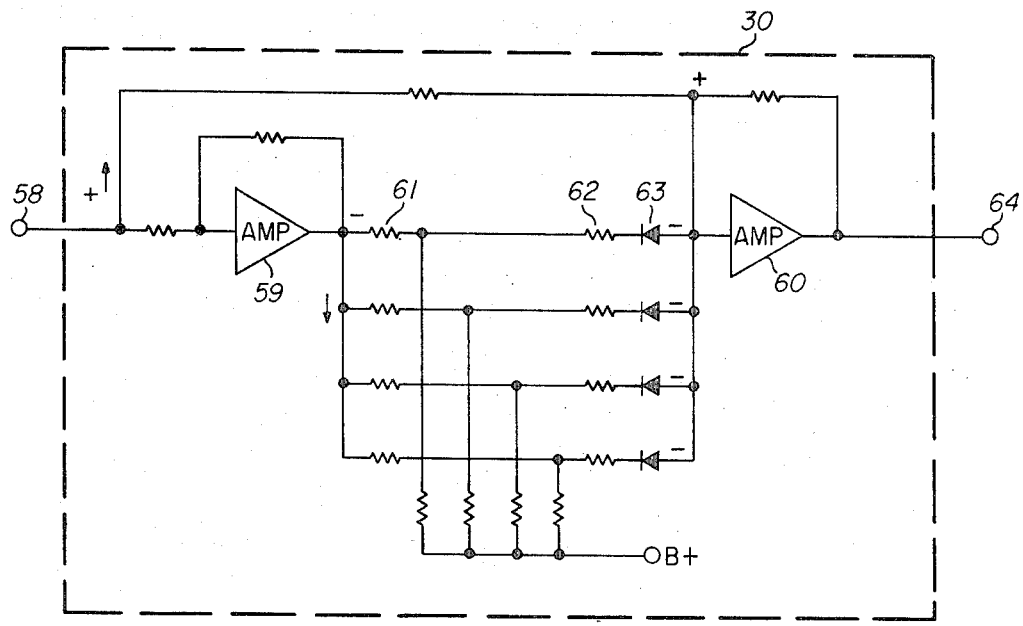
FIG. 4 is a schematic diagram of one of the function generator circuits of the surface electronics.

Referring now to FIG. 4, a function generator circuit according to the present invention is illustrated. Function generator circuit 30 is shown for illustration purposes; however, it is to be understood that the function generator circuit of FIG. 4 also illustrates the function generator circuits 31 and 32. The signal from count rate meter 27 is fed into the input terminal 58 and into the input of amplifiers 59 and 60. Amplifier 59 inverts a positive-going signal into a negative-going signal. The resistor 61 determines the first break point and resistor 62 determines the slope of the output curve after the first break point. The positive-going input voltage to amplifier 60 is bucked by the controlled negative-going signal through the resistors 61 and 62 and diode 63. It will be appreciated that the function generator circuit 30 shown in FIG. 4 is a typical diode resistor matrix function generator circuit and that the additional details of the circuitry need not be described. The function generator circuit receives a signal at input terminal 58 and changes the shape of the signal to a form suitable for additional processing before it is transmitted to the output terminal 64.

Figure 5:
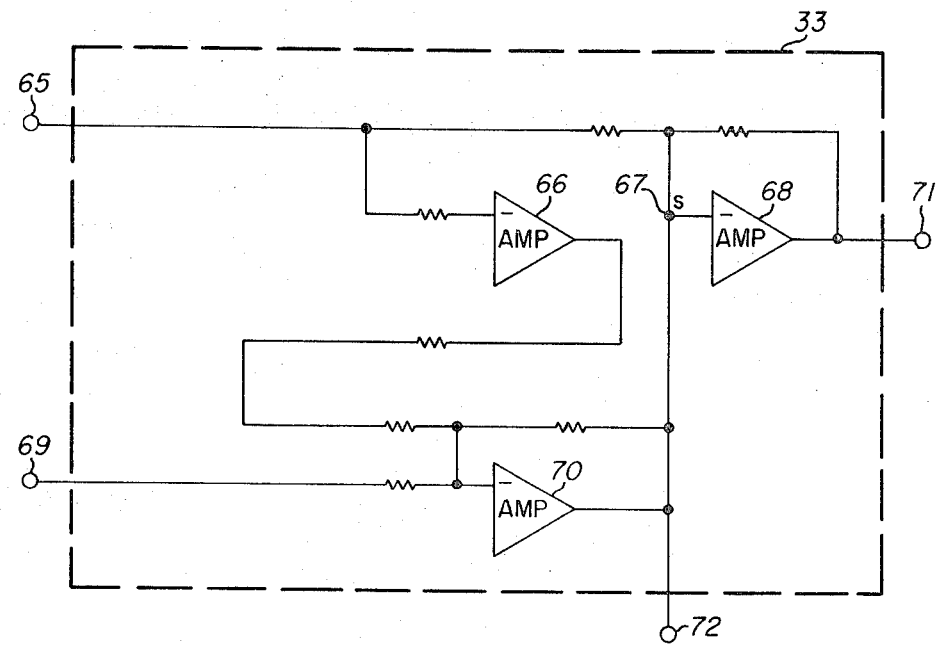
FIG. 5 is a schematic diagram of one of the comparator and summing circuits of the surface electronics.

Referring now to FIG. 5, a comparator and summing circuit according to the present invention is illustrated. The comparator and summing circuit 33 is shown for illustration purposes; however, it is to be understood that the comparator and summing circuit of FIG. 5 also illustrates the comparator and summing circuit 35 of FIG. 2. The signal from the function generator circuit 30 is transmitted to the input terminal 65 of the comparator and summing circuit 33 and is fed into the input of amplifier 66 and into the summing junction 67 of the summing amplifier 68. The signal from the function generator circuit 31 is transmitted to the input terminal 69 and fed into amplifier 70. The signal from input terminal 65 after being inverted by amplifier 66 is also fed into the comparator amplifier 70. For zero mud cake, the signals from the long-spaced and short-spaced detectors entering through inputs 65 and 69 respectively oppose each other at the input of amplifier 70 and the output of amplifier 70 is zero; therefore, no signal is being sent to the summing junction 67 of the summing amplifier 68. The output of amplifier 68 will be the linearized bulk density signal with no mud cake correction.

In the event of light weight mud cake, the short-spaced signal from input terminal 69 into amplifier 70 will be more positive than without mud cake. The positive signal into amplifier 70 is inverted and the negative signal is sent to the summing junction 67 of amplifier 68 which subtracts from the signal from the long-spaced detector to amplifier 68 giving the correct density signal out at terminal 71 from amplifier 68. In the case of heavy mud cake, the output of amplifier 70 goes positive which will add to the long-spaced signal at the summing junction 67 of amplifier 68. Again, the output of amplifier 68 will return to the correct density value. The output of amplifier 70 at output terminal 72 goes from zero for no mud cake to negative for light mud cake and to positive for heavy mud cake.

Figure 6:
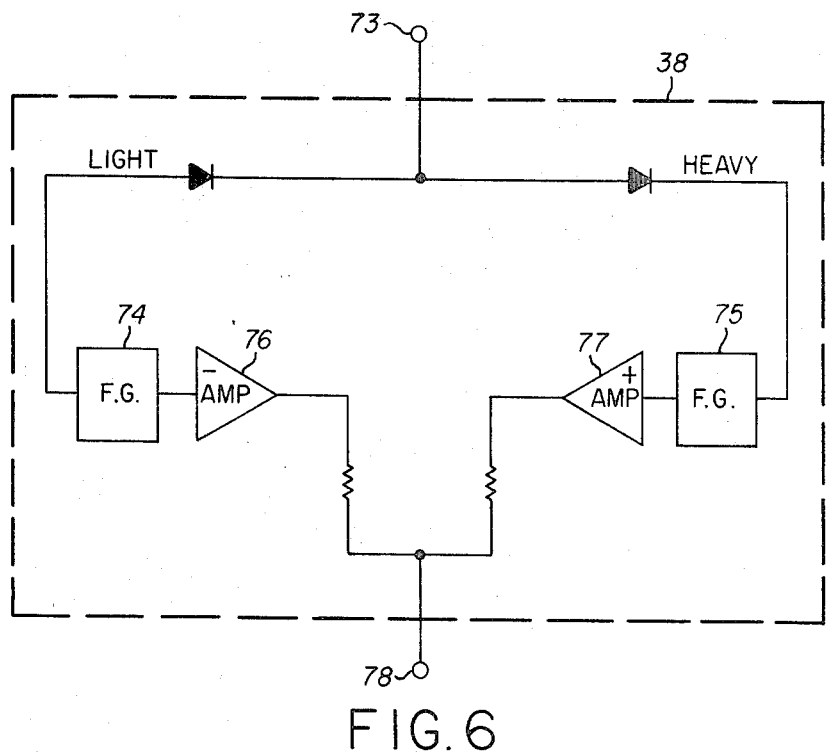
FIG. 6 is a schematic diagram of the compensation signal processor circuit of the surface electronics.

Referring now to FIG. 6, the compensation signal processor circuit is illustrated. The output signal from output terminal 72 of the comparator and summing circuit 33 shown in FIG. 5 is transmitted to the input terminal 73 of the compensation signal processor circuit 38. Since both light and heavy mud cakes make the neutron porosity read high, the correction sent to the comparator and summing circuit 35 shown in FIG. 2 must always reduce the porosity signal. As indicated above, the output signal at output terminal 72 of the comparator and summing circuit 33 shown in FIG. 5 goes from zero for no mud cake to negative for light mud cake and to positive for heavy mud cake. In addition, light mud cake contains more hydrogen and requires a larger correction than a heavy mud cake of the same thickness that contains less hydrogen. The compensation signal processor 38 must therefore convert the signal into the proper mud cake compensation signal before it is fed into the comparator and summing circuit 35. This is done by routing the negative-going signal through function generator 74 and the positive-going signal through function generator 75. The output of the respective function generators are fed through amplifiers 76 and 77. One amplifier will invert its input signal and the other will not; therefore, the output signal to the comparator and summing circuit 35 is the same polarity for both light and heavy mud cake inputs and the proper mud cake compensation signal will be applied.

The embodiments of an invention in which an exclusive property or privilege is claimed are defined as follows:

1. A well logging method for logging the formations surrounding a well bore and producing a mud cake compensated neutron log, comprising the steps of:
   irradiating said formations with neutrons and gamma rays;
   detecting gamma radiation from the formations at a first location in said well bore and providing a first electrical signal representing said gamma radiation;
   detecting gamma radiation from the formations at a second location in said well bore and providing a second electrical signal representing said gamma radiation;
   detecting neutron radiation from the formations and providing a third electrical signal representing said neutron radiation;
   comparing said first and second electrical signals and providing a correction signal representing mud cake; and
   applying said correction signal to said third signal thereby providing a mud cake compensated neutron logging signal.

2. The method of claim 1 including the step of recording said mud cake compensated neutron logging signal.

3. The method of claim 1 including the step of applying said correction signal to said first electrical signal thereby providing a mud cake compensated gamma logging signal.

4. The method of claim 3 including the step of recording said mud cake compensated neutron logging signal and said mud cake compensated gamma logging signal.

5. A well logging apparatus for producing a mud cake compensated neutron log of the formations surrounding a well bore, comprising:
   a borehole instrument housing adapted to traverse said well bore;
   source means positioned in said instrument housing for irradiating the formations surrounding the well bore with neutrons and gamma rays;
   first radioactivity detector means positioned in said housing for detecting gamma rays from the formations surrounding the well bore, said first detector means having a first electrical output;
   second radioactivity detector means positioned in said housing for detecting gamma rays from the formations surrounding the well bore, said second detector means having a second electrical output;

third radioactivity detector means positioned in said housing for detecting neutrons from the formations surrounding the well bore, said third detector means having a third electrical output; and
   means responsive to said first and second electrical outputs for compensating the third electrical output for mud cake, thereby providing a signal for producing a mud cake compensated neutron log of the formations.

6. The apparatus of claim 5 wherein said first detector means has an additional electrical output and including means responsive to said first and second electrical outputs for compensating said additional electrical output for mud cake, thereby providing a signal for producing a simultaneous mud cake compensated density log.

7. The apparatus of claim 6 including recorder means for recording said signal for producing a simultaneous mud cake compensated density log.

8. The apparatus of claim 7 including recorder means for recording said signal for producing a compensated neutron log.

9. The apparatus of claim 8 wherein said source means includes an individual neutron source and an individual gamma ray source.

* * * * *